United States Patent [19]
Robinson

[11] Patent Number: 5,633,957
[45] Date of Patent: May 27, 1997

[54] METHOD AND APPARATUS FOR DETERMINING POSITIONAL GUIDELINES OF HANDWRITTEN DATA

[75] Inventor: Tony Robinson, Palo Alto, Calif.

[73] Assignee: Compaq Computer Corporation, Houston, Tex.

[21] Appl. No.: 307,374

[22] Filed: Sep. 16, 1994

[51] Int. Cl.$^6$ .................................................. G06F 3/00
[52] U.S. Cl. ...................... 382/292; 382/189; 382/179; 382/203; 382/286
[58] Field of Search ................ 382/186–187, 382/189, 203, 286, 292, 179; 395/155–161, 149, 148; 364/419.1, 419.17; 345/173–183

[56] References Cited

U.S. PATENT DOCUMENTS

| | | | |
|---|---|---|---|
| 4,727,588 | 2/1988 | Fox et al. | 382/189 |
| 4,776,024 | 10/1988 | Katoh et al. | 382/174 |
| 5,172,422 | 12/1992 | Tan | 382/174 |
| 5,327,342 | 7/1994 | Roy | 364/419.1 |
| 5,396,566 | 3/1995 | Bruce et al. | 382/187 |
| 5,544,259 | 8/1996 | McCubbrey | 382/177 |
| 5,544,261 | 8/1996 | Bellegarda et al. | 382/187 |
| 5,557,689 | 9/1996 | Huttenlocher et al. | 382/177 |

FOREIGN PATENT DOCUMENTS

| | | | |
|---|---|---|---|
| 5-197477 | 8/1993 | Japan | G06F 3/03 |
| 5-282091 | 10/1993 | Japan | G06F 3/03 |

*Primary Examiner*—Mark R. Powell
*Assistant Examiner*—John E. Breene
*Attorney, Agent, or Firm*—Fish & Neave; Jeffrey H. Ingerman

[57] ABSTRACT

The present invention provides a method and apparatus for determining a positional guideline, such as a baseline or ascender line, of handwritten data. This positional guideline allows for accurate positioning of the data on a computer display. It is calculated by counting the number of pixels per horizontal row in the block of data. These counts of pixels per row are then filtered using a wide moving average. The filtered rows of pixels are then analyzed per row to determine the positional guideline for the given block of handwritten data.

32 Claims, 11 Drawing Sheets

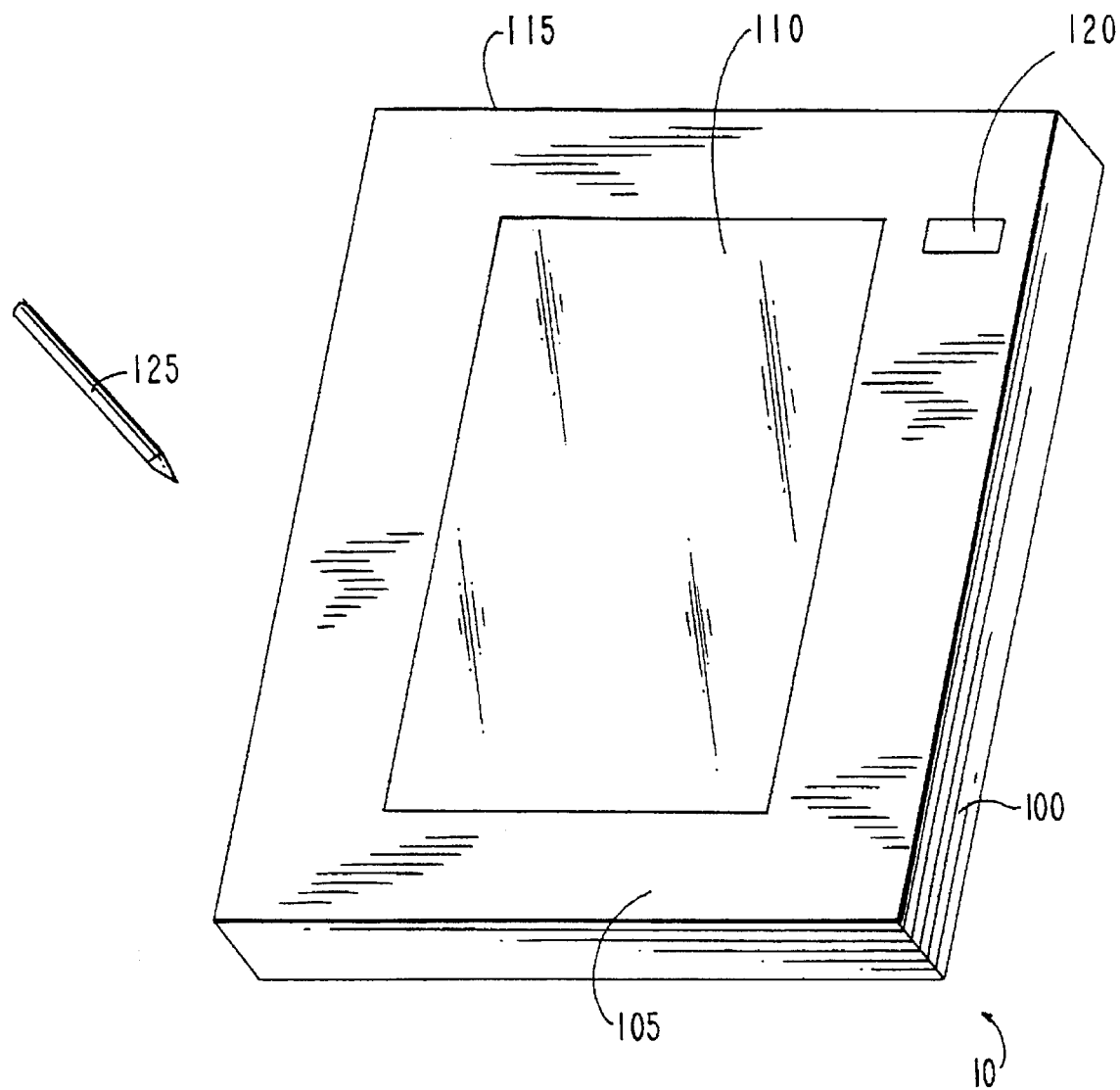
FIG. IA

METHOD AND APPARATUS FOR DETERMINING POSITIONAL GUIDELINES OF HANDWRITTEN DATA

BACKGROUND OF THE INVENTION

This invention relates to the field of formatting handwritten data displayed on computer systems.

A typical computer system may include a central processing unit (CPU), main memory such as random access memory (RAM), a data entry device including a positioning device, a mass storage device such as one or more disk drives, a display and/or a printer. In previously known computers, the data entry device often consists of a keyboard, on which a user enters data by typing. The positioning device of a previously known computer system may have consisted of a "mouse" or other cursor positioning device.

The positioning of typewritten characters or words on a computer display is a common operation for previously known computers. This positioning is usually done using the baseline of a character or word. A baseline is the horizontal line on which text characters or words "hang." By knowing the baseline of a character or word the computer can correctly position the character or word relative to other characters or words. In previously known devices the baseline information about each character is usually stored in computer memory.

Computer systems have also developed that can accept handwritten data entry rather than keyboard data entry. These systems are often characterized by the use of a pen, stylus, or other writing device, to enter handwritten data directly on the display of the computer system. Alternatively, these systems may provide for a user to enter data on a digitizing tablet or other input device, with the image of the written input displayed on a separate computer display output device. The writing device for entering handwritten or freestyle stroke input information is not limited to a pen or stylus, but may be any input device such as a mouse, trackball, pointer, or even a user's fingers. Such systems are not necessarily limited to receiving data generated by human users; for example, machine generated data may also be inputted into and accepted by such systems.

Computers in one class of handwriting entry computer systems are referred to as "pen-based" computers. In a pen-based computer system, a writer can input information on a display by "writing" directly on the display. A writing device, such as a pen or stylus, is used to enter information on the display. In a typical pen-based computer system, a user touches the stylus to the display and writes as he or she would on a piece of paper, by making a series of pen strokes to form letters or words. A line appears on the display that follows the path of travel of the pen point so that the pen strokes appear on the display just as ink would appear on a handwritten page. Thus the user can enter information into the computer by writing on the display. Pen-based computers typically have a display surface that serves as both an input receiving device and as an output display device.

A disadvantage with pen-based computer systems is the proper formatting of handwritten information. Specifically, these systems have difficulty accurately positioning handwritten characters or words relative to each other. This is because, as with unlined paper, it is often hard for a user to write in a straight line. Furthermore, unlike typewritten characters or words, where the computer inherently knows the baseline, pen-based computers systems do not know the baseline of the handwritten characters or words. This is because every time a person handwrites a character or word it may appear differently and thus the baseline may be different. Also, the computer may not immediately attempt to perform character recognition and may thus not even know what the character or word is supposed to be. Moreover a person may not properly align all of the characters in a word. The result is that computer systems that accept handwritten data entry have not been able to accurately position and display handwritten words or characters in a straight line.

This becomes even more of a problem when a user performs operations such as inserting and deleting handwritten characters or words. In these situations the computer has no way of knowing how to position inserted words or characters relative to existing words or characters and has no way of knowing how to reposition existing words or characters when other words or characters have been deleted.

One previously known solution to this problem is for the computer system to supply the user with a line to write the handwritten words, much like one would write on ruled paper. The problem with that system is that it relies on the user to write on the line. If the user ignores the line, the handwritten text will not be positioned properly. Furthermore, if the user decides to insert handwritten text in the middle of a line of handwritten text, unless a space on the line is made for this new text, the computer cannot determine what the baseline of the inserted word is.

It would be desirable to identify a positional guideline, such as a baseline or ascender line, of handwritten data. This positional guideline could then be used to accurately position handwritten data on a computer display and would further allow for easy insertion and deletion of handwritten data. The guideline could also be used to change the appearance of handwritten data—such as by italicizing.

SUMMARY OF THE INVENTION

It is an object of this invention to identify a positional guideline, such as a baseline or ascender line, of handwritten data.

It is also an object of this invention to use the positional guideline to accurately position handwritten data on a computer display.

It is a further object of this invention to use the positional guideline to change the appearance of handwritten data, such as by italicizing the data.

In accordance with this invention, there is provided a method for determining a positional guideline of handwritten data. The method includes entering handwritten data into a computer system that has the ability to display the data. A positional guideline, such as baseline or ascender line, of the handwritten data is then determined by analyzing the handwritten data. The data is then positioned on the display with reference to this positional guideline. The handwritten data can also be rotated around the positional guideline, thus allowing the handwritten data to be italicized.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 1A is a perspective view of a handwriting entry computer;

DETAILED DESCRIPTION OF THE INVENTION

Figure 1B:
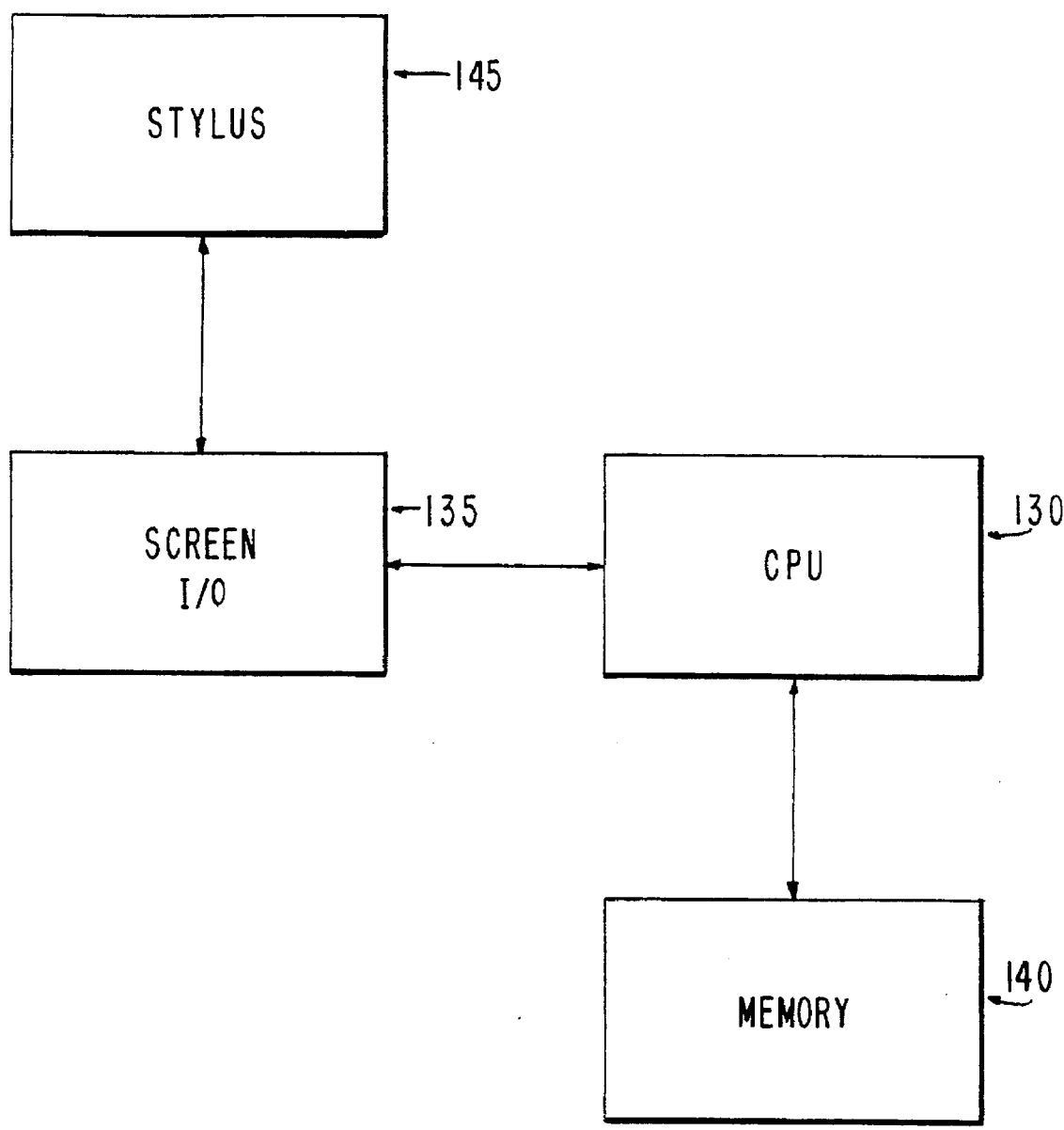
FIG. 1B is a block diagram of a handwriting entry computer.

The present invention is a method and apparatus for determining the positional guidelines of handwritten data with specific reference to the determination of handwritten baselines or ascender lines.

The preferred embodiment of this invention can determine either the baseline or ascender line of a handwritten block of data.

A display is preferably provided onto which a user directly handwrites data. The system preferably stores enough information about the data so that it can identify the row and column location of every digitized point or "pixel" that makes up the handwritten data.

In the preferred embodiment, the system creates a list (the "Row List") based on the locations of the pixels that make up handwritten data. Each position in the list represents a row location that the handwritten data intersect. The value of each position in the list represents the number of pixels of the handwritten data that are located on that particular row.

The Row List is preferably created by scanning each row that the handwritten data are on (from the top row of the data to the bottom row of the data) and counting the number of pixels in that row that the data intersect.

The Row List of a handwritten word with few or no ascenders or descenders appears as a bell shaped curve when graphed. It has been empirically found that the baseline of such words is located at the lowest part of the curve's descent, and the ascender line is located at the lowest part of the curve's ascent. Thus if all handwritten words had few or no ascenders or descenders, the system could identify the baseline of these words by scanning from the row with highest number of pixels—i.e., the highest point of the curve, towards the end of the descent portion of the curve, until it found the row with the lowest number of pixels—i.e., the lowest point of the curve's descent.

The system could identify the ascender line in a similar manner by scanning from the highest point on the curve towards the beginning of the ascent portion of the curve until it found the lowest part of the curve's ascent.

However, words with more descenders produce a slightly different graph. The presence of descenders introduces a spike at the end of the descent portion of the usual bell shaped curve. It has been empirically found that the baseline of such words is the row between the bell and the spike. This row, however, is no longer the lowest part of the curve's descent, which appears beyond the spike. Because of this, if the system where to scan from the highest point on the curve towards the end of the curve looking for the lowest point, it would not identify the correct location of the baseline for words with many descenders.

Similarly, words with many ascenders introduce a spike at the beginning of the ascent portion of the bell shaped curve. It has been found empirically that the ascender line of such words is the row between the spike and the bell. Again, as with baselines, the system described above will not find the proper ascender line.

A particularly preferred embodiment of this invention solves this problem by filtering the Row List, preferably using a wide moving average, to create a "Filtered Row List." The baseline or ascender line is then determined by analyzing this Filtered Row List.

A moving average assigns a value to a particular row that is an average of the values of a selected number of rows before, including and after that particular row. Thus if one takes a moving average of a particular row with a high value that is surrounded by rows with low values, the moving average value of that row will be somewhere between its original high value and the low values of the surrounding rows. The "wider" the moving average—i.e., the larger the number of surrounding rows one uses to calculate the moving average, the closer the moving average value of the particular row will be to the values of surrounding rows.

By taking a sufficiently wide moving average of each row in the Row List, spikes in the list created by descenders are transformed substantially into plateaus. It has been found empirically that the baseline of words with such ascender and descender spikes is the row represented by the point on this plateau closest to the descent portion of the bell shaped curve. Similarly, if a wide moving average is taken of a word with many ascenders, the row represented by the spike at the beginning of the Row List of such a word will become substantially a plateau, and the ascender line will be the row represented by the point of this plateau closest to the ascent portion of the bell shaped curve.

This particularly preferred embodiment of the invention assigns a wide moving average value to each row of the Filtered Row List equal to the sum of the values of the row in question, a predetermined number (k) of rows in the Row List before the row in question, and the same number of k rows after the row in question (i.e., 2k+1 rows in all), divided by the number of rows summed (2k+1). It has been empirically determined that for adult handwritting using a digitizer with a resolution of 1000 dpi, k=16 yields the best wide moving average. For a digitizer with a higher input resolution k should be larger, and for a digitizer with a lower resolution k should be smaller.

This particularly preferred embodiment of the invention then stores two numbers: (1) the row number of the row with the most filtered pixels—i.e., the top of the bell shaped curve, and (2) a minimum value. For baseline detection the minimum value equals the value of the point represented by the row with the fewest filtered pixels after the row with the most filtered pixels—i.e., the lowest point of the curve's descent. For ascender detection the minimum value equals the value of the point represented by the row with the fewest filtered pixels before the row with the most filtered pixels—i.e., the lowest point of the curve's ascent.

Using this information the baseline or ascender line of a handwritten word is identified by scanning the Filtered Row List (forward from the top of the bell for baseline detection, backward from top of the bell for ascender line detection) and looking for the first of either (1) a plateau of filtered row values—the row corresponding to the first row value of the plateau encountered is the baseline/ascender line, or (2) the row represented by the first point that is the lowest point encountered on the curve's ascent or descent—i.e., the first row encountered whose value equals the minimum value calculated above.

If there are many descenders or ascenders in the handwritten word, the system will first encounter situation (1) and the correct baseline, or ascender line, will be calculated. If, however, there are few descenders or ascenders in the handwritten word, the system will first encounter situation (2) and again the correct baseline or ascender line will be determined.

It has been found that spikes, other than those caused by ascenders and descenders, may appear in the Row Lists of many words. These "random" spikes may appear because of various idiosyncrasies in a particular user's handwriting. As with ascender and descender spikes, these random spikes become plateaus in the Filtered Row List. To make sure that the plateau the system identifies in situation (1) is the descender or ascender plateau and not one these "random" plateaus, the system performs two tests. First the system makes sure that the values of the rows in the plateau of rows are at most a predetermined percentage of the row with the highest value. For determining baselines, it has been empirically determined that the percentage should be about 50% of the row with the highest value. The percentage for determining ascenders has been found to be about 66%. Second, the system makes sure that the plateau is at least a predetermined number of rows wide. It has been empirically determined that the steeper the bell shaped curve created by the graph of the Filtered Pixel List, the smaller this predetermined number of rows needs to be. The predetermined number of rows has been empirically determined to preferably be equal to the difference between the row number of the row with the highest value, and the row number of the first row whose value is less than or equal to the predetermined percentage of the row with the highest value.

The present invention is preferably used with pen-based computer operating systems such as PenPoint™, manufactured by GO™ Corporation, of Foster City, Calif., and Microsoft Windows for Pen™ from Microsoft Corporation, of Redmond, Wash. However, the invention can be used with other operating systems (both pen-based and non-pen based) as well.

Pen-based operating systems such as PenPoint™ provide input/output information to applications running under the operating system and provide certain functions and utilities that can be used by the applications. For example, PenPoint™ provides certain data about stylus position and movement (such as "pen down," "pen up," "pen into proximity," "pen out of proximity," pen position, and a record of pen movement), provides certain handwriting recognition algorithms, and provides access to a number of standard commands.

FIG. 1A illustrates a preferred embodiment of a handwriting entry computer 10 of a type with which the present invention may be used. Computer 10 has a thin, flat housing 100. The front of the housing 105 features a position sensing display panel 110 and a power switch 120. Input/output (I/O) ports for a disk drive, communications, and a printer, a power supply socket, and a contrast control (not visible) are preferably located along the back side 115 of housing 105.

The position sensing display panel 110 preferably has an electrostatic position sensing surface preferably combined with a monochrome liquid crystal display. The display preferably has a position sensing resolution of approximately 1000 "pixels" per inch (1000 dpi). The position sensing surface preferably senses the position of a special stylus 125 when the tip of the stylus contacts, or is brought into close proximity with, the surface.

The stylus may be used to write characters, words or illustrations on the display, as well as to select and manipulate displayed items. The handling of handwritten input generally depends on the specific software application being used.

FIG. 1B is a block diagram representing a preferred embodiment of the handwriting computer of FIG. 1A. It includes a central processing unit (CPU) 130 that receives input from screen I/O 135. This input has been entered onto screen I/O 135 using stylus 145. CPU 130 sends processed output to screen I/O 135. CPU 130 also sends and receives data from memory 140. In the presently preferred embodiment of this invention CPU 130 is a 80486 or 80586 processor—preferably an I486® or PENTIUM® processor made by Intel Corp. of Santa Clara, Calif., although any other suitable processor may be used.

Figure 2A:
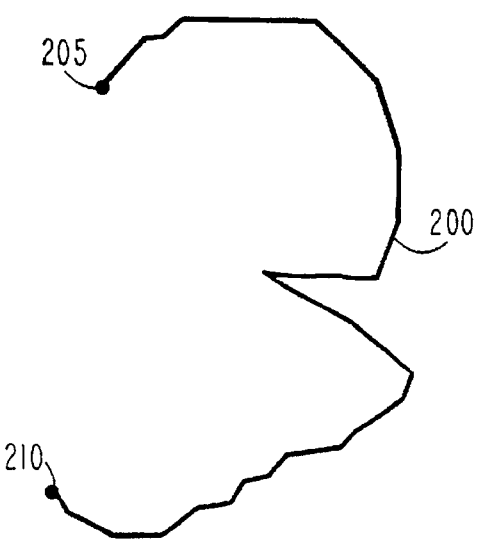
FIGS. 2A–B illustrates how data points for a stroke are recorded.
Figure 2B:
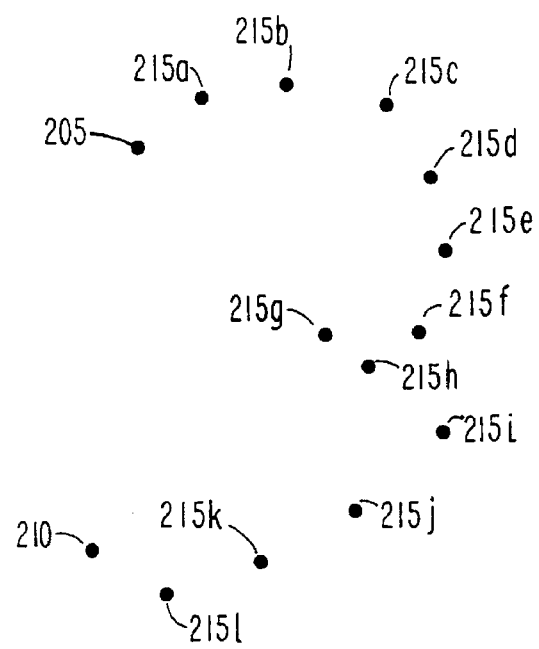

With respect to the present invention, handwritten input is preferably recorded as a series of strokes. Each stroke preferably is determined by the movement of the stylus from a "pen down" event (i.e., the stylus tip making contact with the display) to an immediately following "pen up" event (i.e., the stylus tip terminating contact with the display). FIGS. 2A and 2B illustrate how data points for a stroke are recorded for one preferred embodiment of the invention.

FIG. 2A is an enlarged view of a handwritten stroke 200 that represents the numeral "3." The beginning point of stroke 200, that is the point where the stylus first makes contact with the display, is at point 205. The end point of stroke 200, that is the point where the stylus is lifted from the display, is at point 210.

The display is continually sampled at a rapid rate (in one preferred embodiment, approximately 200 times per second), to determine whether the stylus is contacting the display, and, if so, the coordinates of the point of contact. In this context, "contact," may include remaining within a given small distance of the display.

The stroke recording process begins when the tip of the stylus makes contact with the display. A "pen down" event is recorded, and the coordinates of the contact point are stored. At each succeeding sampling interval, the new position of the stylus is determined. FIG. 2B illustrates the positions 215a to 215l of the stylus for each sampling interval between the "pen down" event at point 205 and the "pen up" event at point 210. (In practice, there would probably be many more points sampled.)

Stroke 200 can thus be described in terms of the coordinates of "pen down" point 205, intermediate positions 215a to 215l, and "pen up" point 210. The line segments between each pair of successive intermediate positions can be described as "segments."

Handwritten input to the computer usually does not consist of a single stroke. Instead, handwriting generally includes letters, numbers or words made up of groups of separate strokes. Strokes that are part of the same handwritten entry typically are closely spaced both in time and in position. In a preferred embodiment of the present invention, if the "pen down" event of a subsequent stroke occurs within approximately 500 milliseconds (the actual duration of the interval is user selectable) of the "pen up" event of the preceding stroke, the subsequent stroke is considered to be part of the same handwritten entry as the preceding stroke. The same is preferably true if the second stroke is made without the stylus being brought out of proximity with, or raised more than approximately one-half inch above, the display screen between the "pen up" event of the first stroke and the "pen down" event of the second stroke.

In addition to or instead of the stroke description scheme described above, other forms of handwritten stroke descriptions may be used. Furthermore, depending on the specific embodiment of the invention, input means other than a handheld stylus may be used to provide input to the invention. For example, input produced by a keyboard, a mouse, a mouse-pen, a light pen, a finger (in conjunction with a touch sensitive panel), a scanner, a video digitizer, or a digitizing pad may be used.

Figure 3:
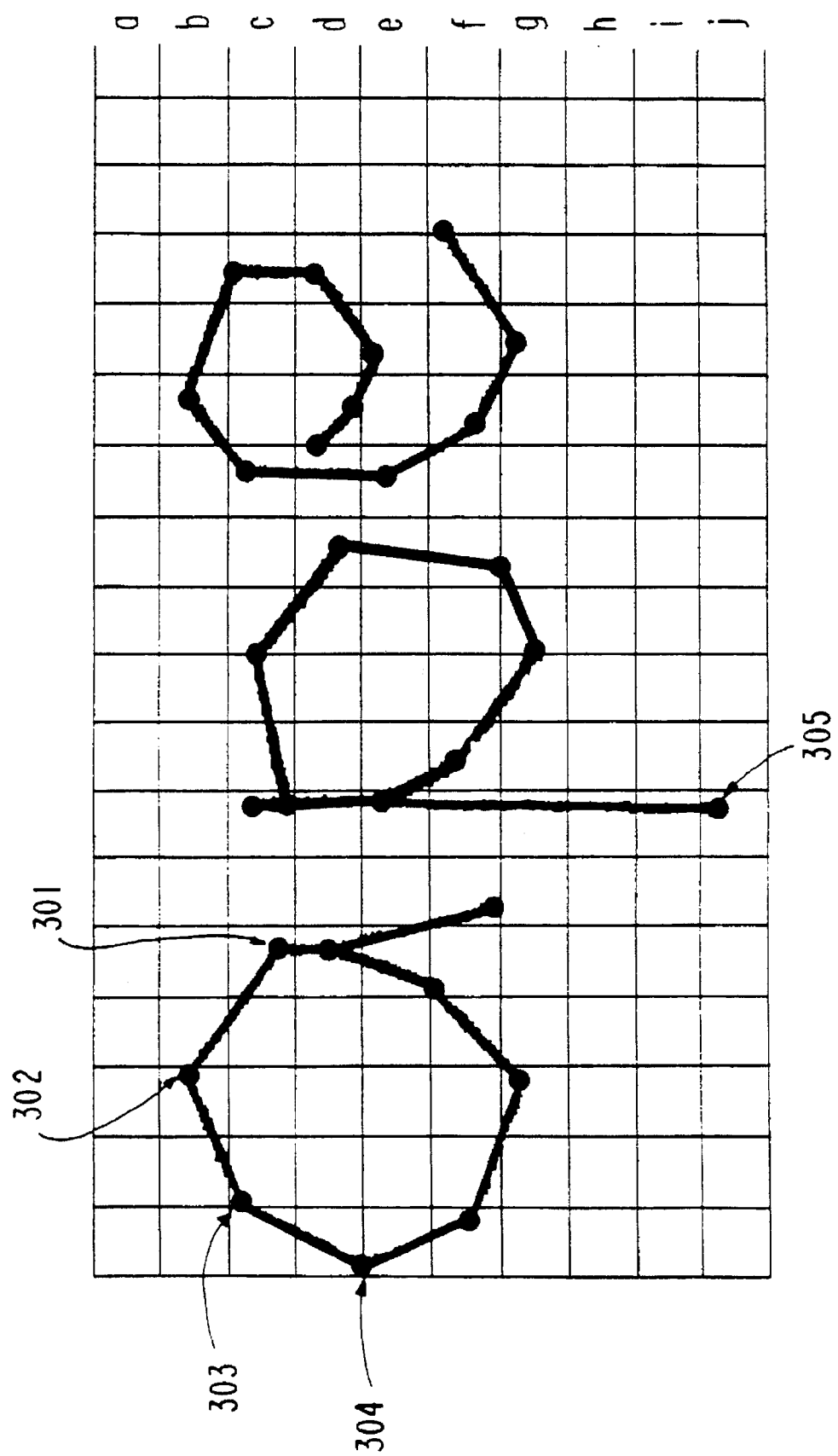
FIG. 3 is a coordinate diagram of the word "ape;"

FIG. 3 is a coordinate diagram of the handwritten word "ape." The letters a–j represent rows that segments of "ape" might possibly intersect. Using the preferred embodiment of the invention, the Row List of "ape" is constructed by counting the number of horizontal pixels that the word intersects at each row and storing that number in the appropriate row location in the list. Thus, for example, row d intersects "ape" in 9 places and so row location d in the Row List would contain the value 9.

This particularly preferred embodiment of the invention constructs this Row List by looking at each successive pair of points that make up the word and increasing the row locations in the Row List that are between that pair by one. Thus, referring to FIG. 3, the system first gets points 301 and 302 of the word "ape" and increments the values of rows c and b (the segment connecting points 301 and 302 spans these two rows) in the Row List by one. The system then gets point 303 and increments the value of row b (the segment between 302 and 303 spans row b only) by one. The system then gets point 304 and increments the values of rows c and d by one. This continues until all pixels in the word "ape" have been processed. At this point, the Row List is complete.

Figure 4A:
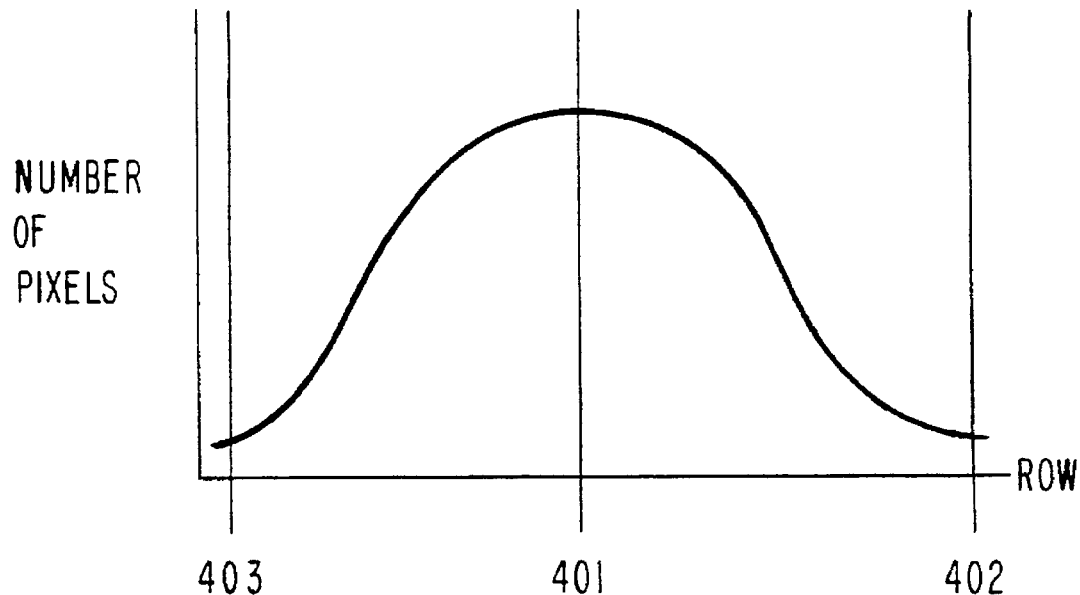
FIG. 4A is a graph of the Row List of a word with no descenders.

FIG. 4A is a graph of the Row List of a word with few or no descending or ascending characters. The baseline, which is the row with the least number of pixels on the descent from the peak representing the row with the most pixels 401, is identified as 402. The ascender line, which is the row with the smallest number of pixels on the ascent from the peak, is identified as 403. It should be noted that while FIG. 3 depicts the top row of the word as the first row in the Row List and the bottom row of the word as the last row in the Row List, this invention is not limited to such an approach. The first row in the Row List may be the bottom row of the word and the last row in the Row List the top row of the word. In this situation, 402 would represent the ascender line and 403 would represent the baseline.

As discussed previously, the baseline or ascender line of words with Row Lists having graphs similar to FIG. 4A could be identified by scanning from 401 down the curve until the lowest part of the curve's descent 402 or ascent 403 is found.

Figure 5A:
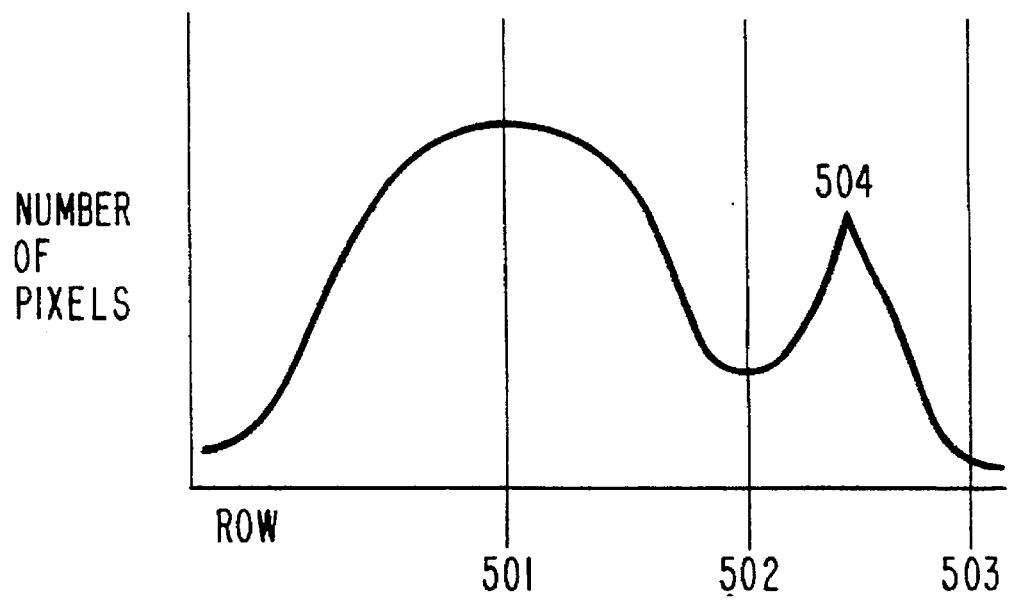
FIG. 5A is a graph of the Row List of a word with many descenders.

FIG. 5A is a graph of the Row List of a word with many descenders. Here, because the word has many descenders, a spike 504 occurs to the right of the bell shaped curve. The baseline 502 is no longer the row with the least number of pixels on the descent from the row with the most pixels 501. Instead the row with the least number of pixels is row 503. Thus the method for identifying the baseline on the graph of FIG. 4A would not work on the graph of FIG. 5A.

Figure 5B:
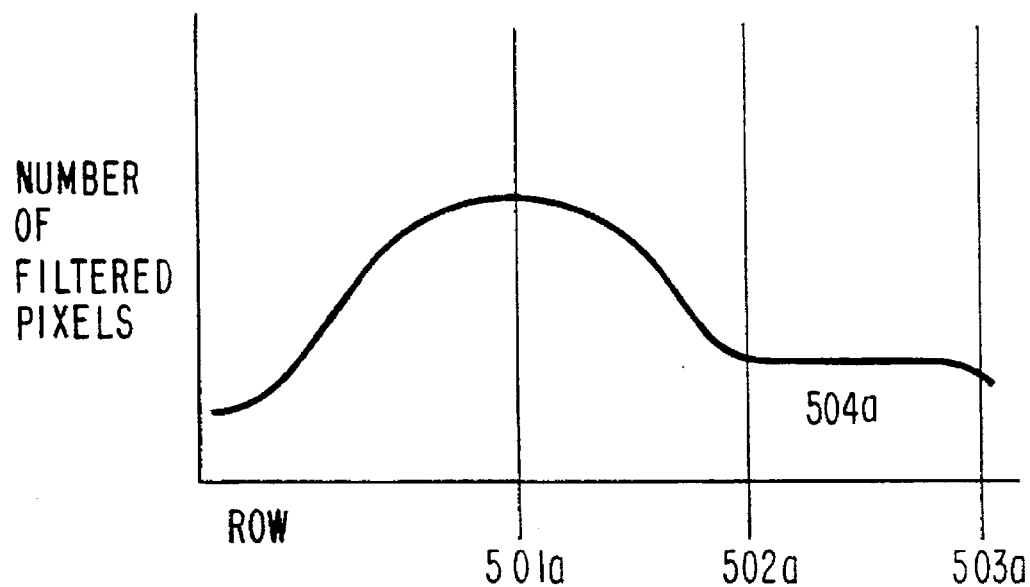
FIG. 5B is a graph of the Filtered Row List of the word in FIG. 5A.

FIG. 5B is a graph of the Filtered Row List of the word with many descenders graphed in FIG. 5A. By taking a wide moving average of the Row List, spike 504 has been transformed into plateau 504a. The beginning row 502a of this plateau is the same row as the baseline 502.

Figure 4B:
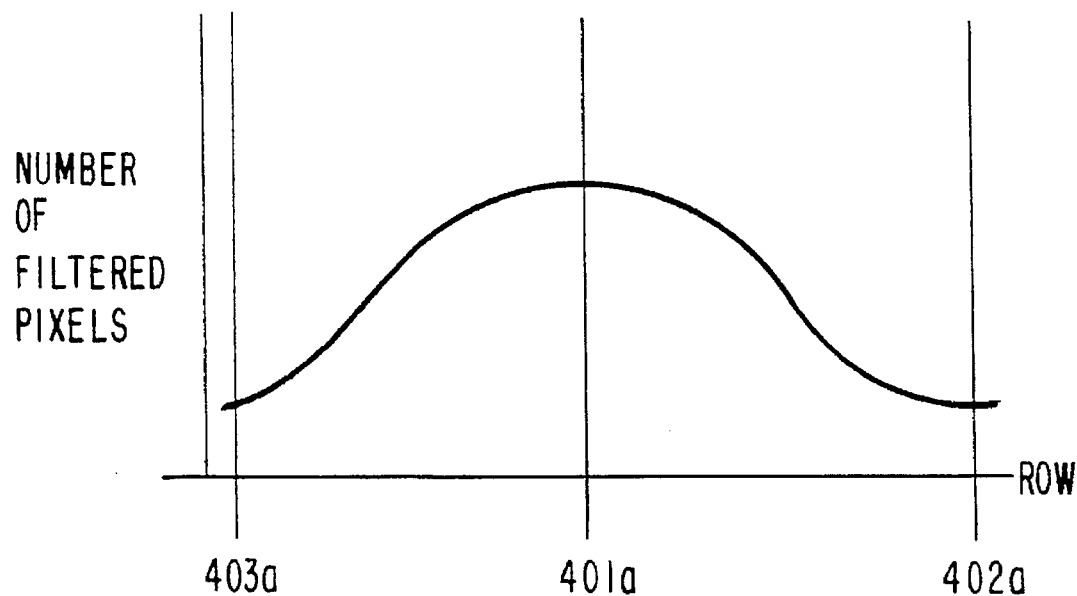
FIG. 4B is a graph of the Filtered Row List of the word in FIG. 4A.

FIG. 4B is a graph of the Filtered Row List of the word with few descenders or ascenders of FIG. 4A. As can be seen the Row List has been "flattened" by the wide moving average. Nevertheless, baseline 402a is the same row as the original baseline 402, and ascender line 403a is the same row as original ascender line 403.

Using the method of the preferred embodiment of the invention the baselines or ascender lines of handwritten material represented by either FIG. 4B or FIG. 5B can be ascertained by scanning in the appropriate direction from the highest point of the respective curve—401a or 501a, and looking for the first of either (1) the first row encountered that is part of a plateau as described previously or (2) the first row encountered that is lowest part of the curve's ascent or descent as appropriate.

With reference to FIG. 4B, if searching for a baseline, the system would scan from 401a forward towards the end of the curve and would first encounter 402a—the first row that is the lowest part of the curve's descent. This would be the baseline.

With reference to FIG. 5B, if searching for a baseline, the system would scan from 501a forward towards the end of the curve and would first encounter plateau 504a. The first row 502a of plateau 504a would be the baseline.

Figure 6:
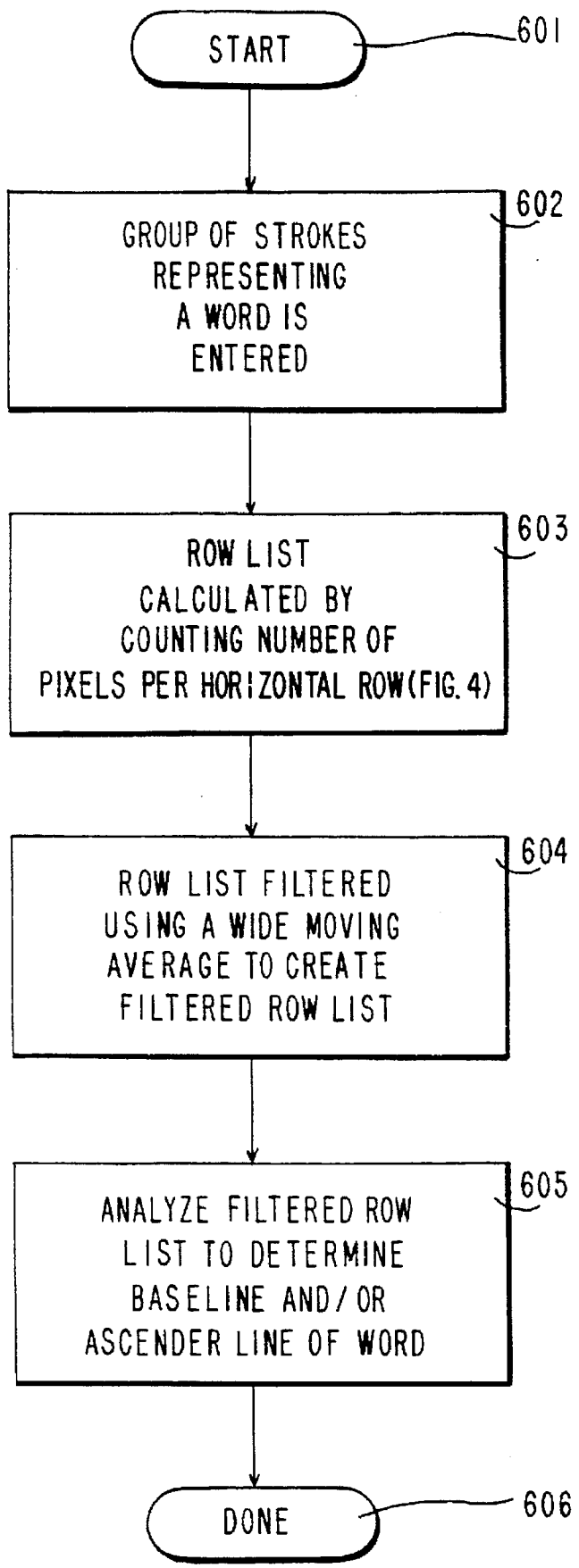
FIG. 6 is a flow chart of the preferred embodiment of the method of the present invention for determining the baseline or ascender line of handwritten data.

FIG. 6 is a flow chart of the preferred embodiment of the method of the present invention for determining the baseline or ascender line of handwritten data. The method starts at step 601. At step 602, a user enters a group of strokes that represent handwritten data (hereinafter "word" will be used to represent handwritten "data") and the locations of those strokes are stored as a sequence of (x,y) coordinate pairs. Then at step 603 the system calculates the number of pixels per horizontal row of that word—the Row List. At step 604 the system filters the Row List using a wide moving average to create a Filtered Row List. Next, at step 605, the system analyzes the Filtered Row List to determine the baseline and/or ascender line for the given word. The method ends at step 606.

Figure 7:
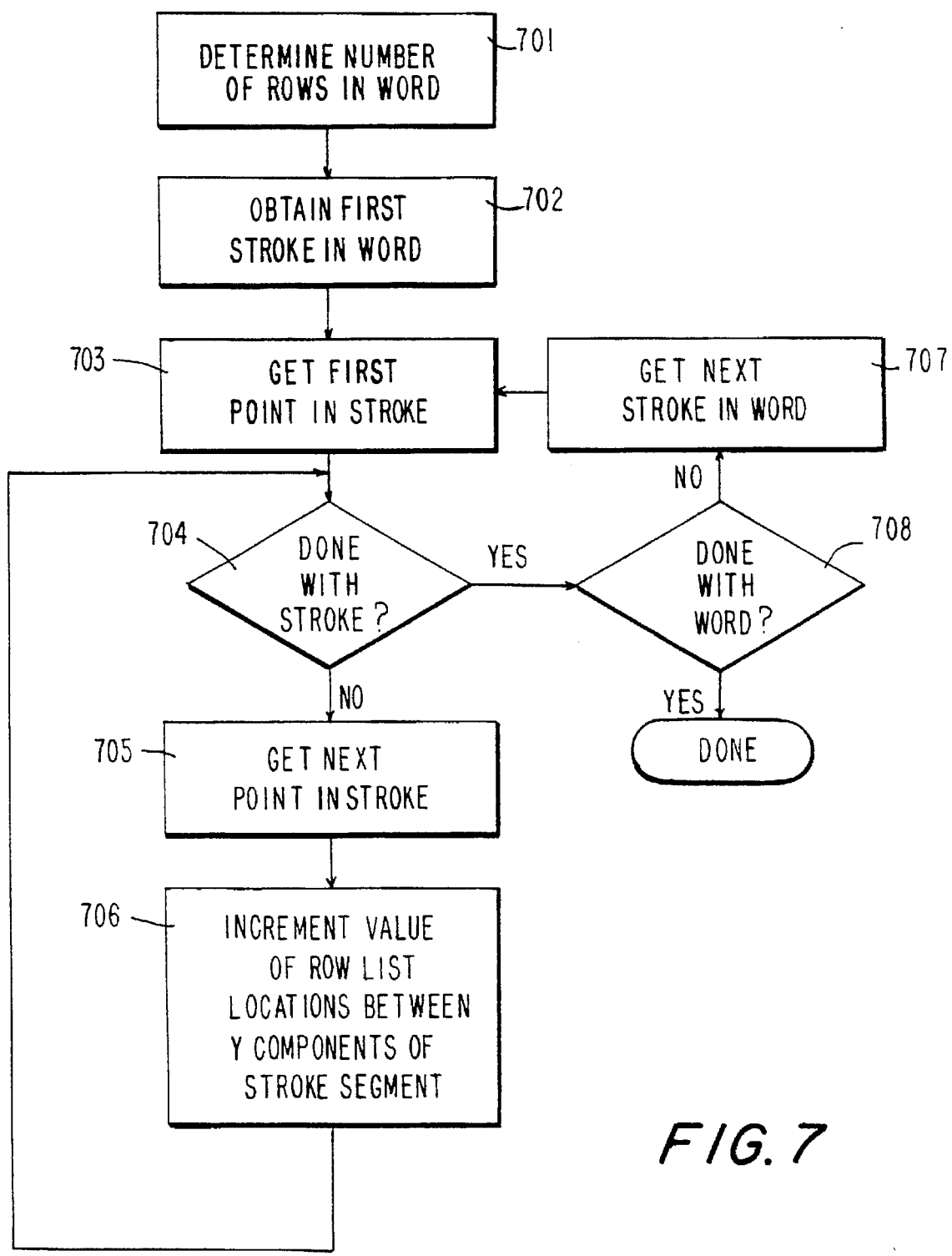
FIG. 7 is a flow chart of the preferred embodiment of the calculation of the Row List of handwritten data.

FIG. 7 is a flow chart of the preferred embodiment of the calculation of the Row List at step 603. At step 701, the system determines the height of the word by subtracting the smallest y stroke coordinate in the word from the largest y stroke coordinate in the word. This number represents the number of rows in Row List.

In steps 702–708 the system identifies each segment of each stroke that makes up the word and counts the number of pixels per horizontal row that the segment intersects. This number is inserted in the appropriate location in the Row List.

At step 702 the system obtains the first stroke in the word. Next at step 703, the system gets the coordinates of the first point in the stroke and makes this the current point. At test 704 the system checks to see if it is done with the stroke. If it is not, the system moves to step 705 and gets the coordinates of the next point in the stroke. Next at step 706, every horizontal row location in the Row List between the y coordinates of the current point and next point in the stroke is incremented by one. The system then makes the next point the current point and loops back to test 704.

If the system is done with the stroke (test 704) the system moves to test 708. At test 708 the system checks to see if it is done with the word. If there are more strokes in the word the system moves to step 707. At step 707 the system gets the next stroke in the word. From step 707 the system loops back to step 703 to get the first point in the next stroke.

If the system is done with the word (test 708) the system now has a complete Row List of the handwritten word.

Figure 8:
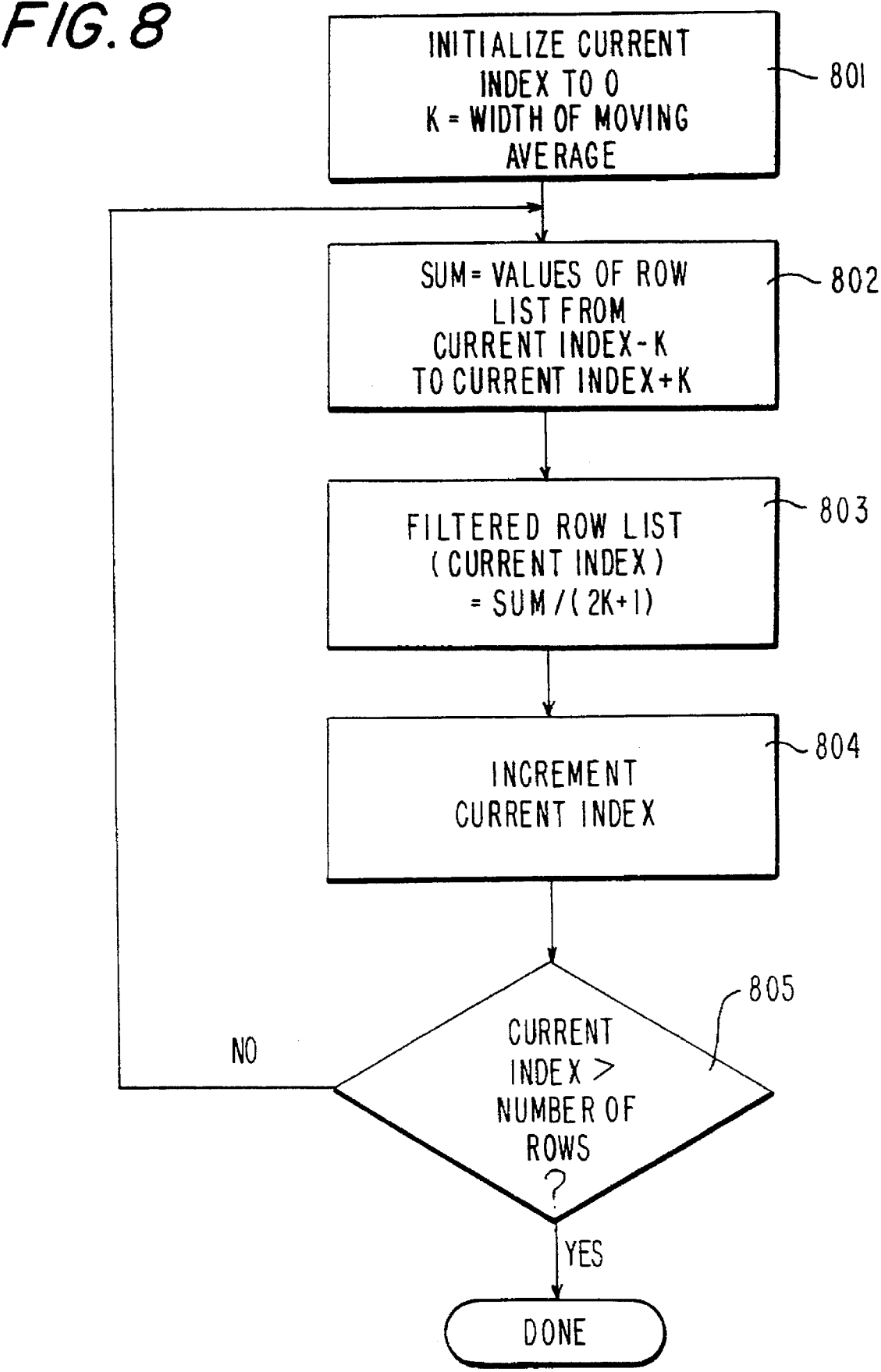
FIG. 8 is a flow chart of the preferred embodiment of the calculation of the Filtered Row List of handwritten data from the Row List.

FIG. 8 is a flow chart of the preferred embodiment of the calculation of the Filtered Row List from the Row List at step 604. At step 801 a row index counter is set to 0. Additionally, a constant k is assigned to be the width of the moving average. It has been empirically determined that for adult handwritting using a digitizer with a resolution of 1000 dpi, k=16 yields the best wide moving average.

Steps 802–805 form a loop that creates the Filtered Row List. At step 802 the values of the Row List from Row List location=(current index value−k) to Row List location= (current index value+k) are summed. If there are fewer than k rows before or after the row pointed to by the current index value, that lesser number of rows in that direction only is used in the summation. Next at step 803, the value of the sum created in 802 is divided by the total number of rows summed, and this value is placed in the current index location of the Filtered Row List. At step 804 the index is incremented by one. Then at test 805 the system checks to see whether the current index value is greater than the number of rows in the word (previously obtained at step 701). If not, the system goes back to step 802. If the current index is greater than the number of rows in the word, the Filtered Row List is complete.

Figure 9:
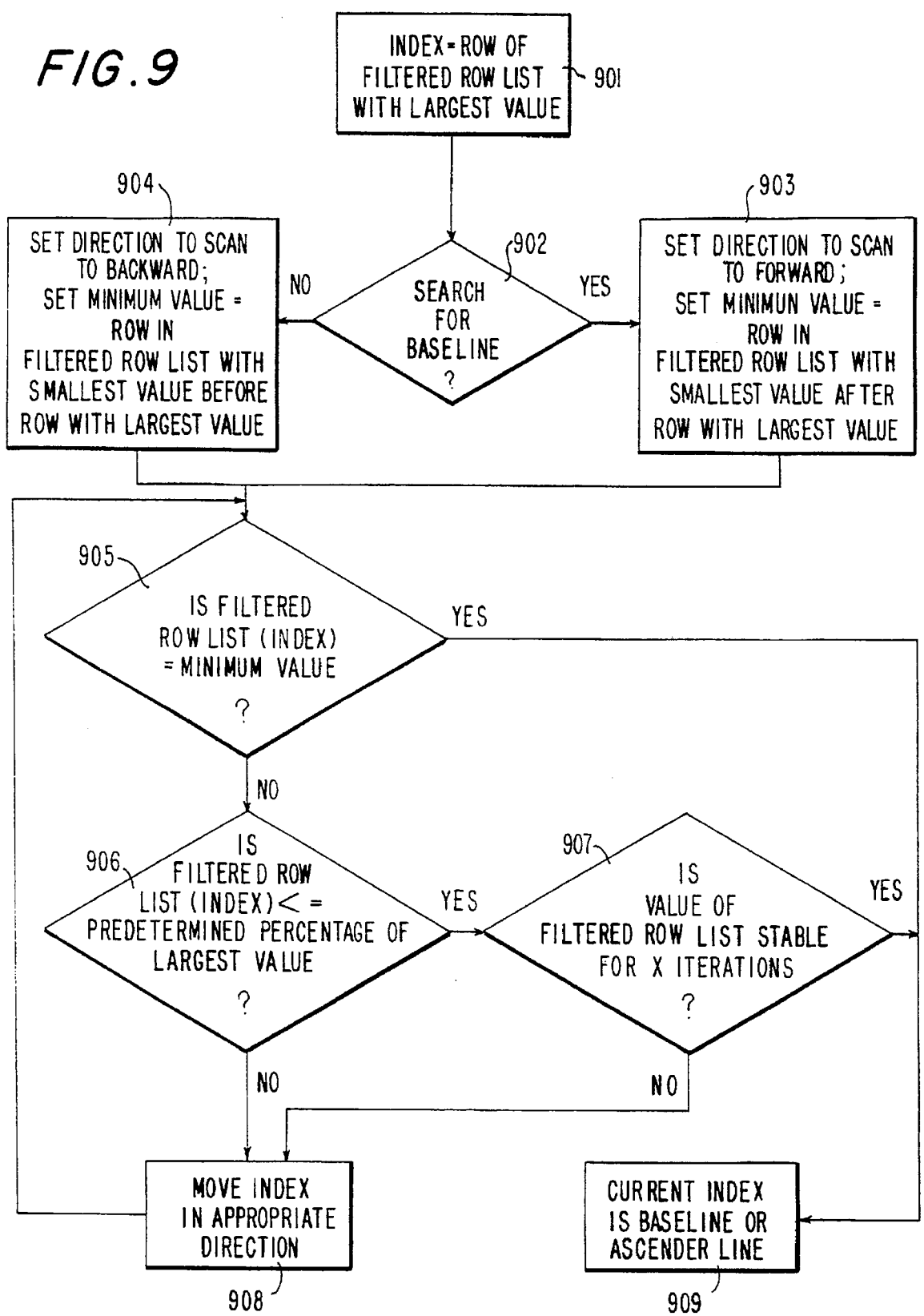
FIG. 9 is a flow chart of the preferred embodiment of the determination of the baseline or ascender line of handwritten data by analyzing the Filtered Row List.

FIG. 9 is a flow chart of the preferred embodiment of the determination of the baseline or ascender line by analyzing the Filtered Row List at step 605. Referring to step 901, an index is assigned to be the row number of the row with the largest value of the Filtered Row List. This row is represented by the top of the bell shaped curve. Next at test 902, the system checks to see if it is searching for the baseline of the word. This information has been previously supplied to the system.

If the system is searching for a baseline, the system moves to step 903 and sets the scanning direction of the Filtered Row List to forward and assigns a minimum value to be equal to the row with the smallest value after the row with the largest value. If at test 902 the system is searching for the ascender line and not the baseline, the system moves to step 904 and the scanning direction is set to backward and the minimum value is assigned to be equal to the row with the smallest value before the row with the largest value.

Next, the system moves to test 905. In test 905 the system checks to see if the value of the row in the Filtered Row List that the index points to is equal to the minimum value. If the test is true then the system moves to step 909 and the baseline or ascender line is assigned to be the current index. This test identifies baselines in words with graphs similar to FIG. 4B.

If test 905 is false then the system moves to test 906 and begins to look for a possible plateau. At test 906 the system checks to see if the value of the row in the Filtered Row List that the index points to is less than are equal to a predetermined percentage of the value of the row in the Filtered Row List with the highest value. For determining baselines, it has been determined by testing that the predetermined percentage should be about 50% of the row with the largest value in the Filtered Row List (about 66% for determining ascender lines).

If test 906 is true, then the system moves to test 907. Test 907 checks to see if the row values of the Filtered Row List a predetermined number of rows (x) after the current index are the same as the value of the row that the current index points to. If they are, then the system moves to step 909 and the baseline or ascender line is assigned to be the current index. The combination of tests 906 and 907 identify baselines in words with graphs that have plateaus similar to the plateau of FIG. 5B. The baseline row of such words is the first row in that plateau. It has been found that the predetermined number of rows (x) to check that yields the best results equals the difference between the row number represented by the peak of the graph in the Filtered Row List and the first index after the peak whose value is a predetermined percentage of the peak. It has been empirically determined that this predetermined percentage be 50% for baseline, and 66% for ascender line.

If either test 906 or 907 fail then the system moves to step 908, moves the index in the appropriate direction, and loops back to test 905.

The previously described method for determining positional guidelines may be performed at any time after the entry of the handwritten data.

While the invention speaks of identifying a positional guideline of handwritten "data," it is suggested that preferred embodiment of this invention, which uses statistical averaging, be used to find baselines or ascender lines of words rather than individual characters. This is because words necessarily contain more data than individual characters, and the accuracy of statistical averaging is directly proportional to the amount of data processed. This invention will, however, find the baselines of individual characters, although there may be a drop in accuracy because of the smaller amount of data processed.

Figure 10:
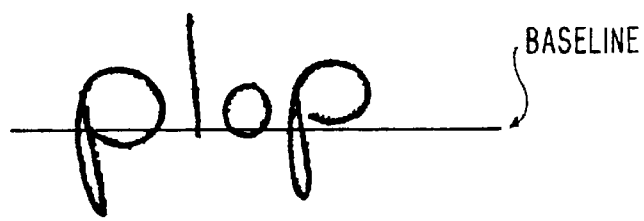
FIG. 10 illustrates the baseline of the entire word "plop;"

Furthermore, when the invention is used to find the positional guidelines of words, it must be noted that this positional guideline will not necessarily be the positional guideline of every character in the word, but will instead be the "average" positional guideline for the entire word, which can be used for alignment of the word with other words. Thus in FIG. 10 it can be seen all the individual character baselines in the word "plop" are either above or below the baseline of the entire word. If, however, the invention is used to determine the positional guideline of individual characters, then each character would be positioned relative to the other characters in the word using their individual positional guidelines—thus creating a single guideline for the entire word.

Figure 11A:
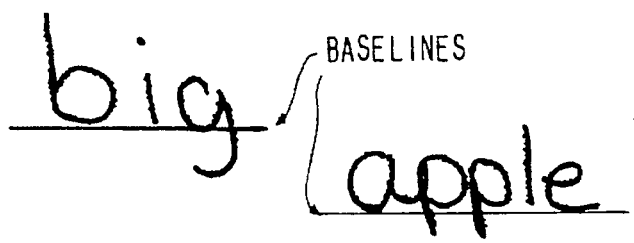
FIGS. 11A and 11B illustrate the repositioning of handwritten data using the baselines of the data.
Figure 11B:
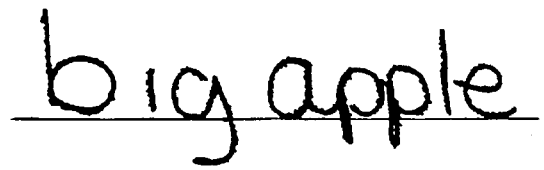
Figure 12A:
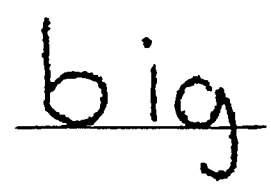
FIGS. 12A and 12B illustrate the italicizing of handwritten data using the data's baseline.
Figure 12B:

Knowing the baseline or ascender line of a word can be used for various operations. First, one can position words relative to each other using their known baselines as a guide. For example the words in FIG. 11A can be repositioned as in FIG. 11B by aligning their baselines. Additionally, handwritten text can be "rotated" around its baseline or ascender line creating an italicized effect such as illustrated by FIGS. 12A and B. This can be done by increasing the x coordinates of all the points in the word above the baseline by an increasing amount with distance from the baseline, while decreasing the x coordinates of all points in the word below the baseline by the same increasing amount.

Furthermore, a handwritten word can be inserted before or between other words by preferably having the user write the word to be inserted at any position on the display, and then having the user indicate, in some manner, where the word is to be inserted. The system would then preferably shift the words after the insertion point an appropriate amount, determine the positional guideline of the word to be inserted, and reposition the inserted word at the location indicated by the user using the positional guidelines of the existing text and inserted word as repositioning guides. Similarly if a user decided to delete a word, the user would identify, in some manner, the word to be deleted, and the system would remove that word from the display and shift the words surrounding the deleted word back using their positional guidelines as repositioning guides.

Thus it is seen that a system for determining a guideline, such as a baseline or ascender line, of handwritten text is provided. One skilled in the art will appreciate that the present invention can be practiced by other than the described embodiments, which are present for purposes of illustration and not of limitation, and the present invention is limited only by the claims that follow.

What is claimed is:

1. A device for positioning handwritten data on a display comprising:

a receiver for receiving input of handwritten data;

a display for displaying said handwritten data;

a data entry device for entering a handwritten block of said handwritten data;

a positional identifier for identifying a positional guideline for said handwritten block; and a data positioner for positioning said handwritten block on said display based on said positional guideline of said handwritten block.

2. The device of claim 1 wherein said positional identifier comprises:

a counter for determining the number of pixels per horizontal row of said handwritten block;

a filter for determining the number of filtered pixels per row by filtering said number of pixels per horizontal row; and an analyzer for analyzing said filtered pixels per row to determine said positional guideline for said handwritten block.

3. The device of claim 2 wherein said filter determines the number of filtered pixels per row from the number of pixels per horizontal row using a wide moving average.

4. The device of claim 3 wherein for each horizontal row, said wide moving average is the average of the number of pixels in said horizontal row, and at most a predetermined number of horizontal rows before and after said horizontal row.

5. The device of claim 4 wherein said predetermined number is 16.

6. The device of claim 2 wherein said counter comprises:

a stroke identifier for identifying the strokes of said handwritten data;

a point identifier for identifying the points of said strokes;

a row identifier for identifying the row locations of said points of said strokes;

an incrementor for incrementing the number of pixels per horizontal row for each row between the row locations of said points of said strokes.

7. The device of claim 2 wherein said number of filtered pixels per row can be represented by a curve, said device further comprising:

a most filtered pixels row identifier for identifying a row with the most filtered pixels on said curve;

a fewest filtered pixel row identifier for identifying the first row with the fewest filtered pixels scanned in a scan starting from said row with the most filtered pixels;

a plateau row identifier for identifying a plateau of rows, said plateau of rows comprising a predetermined number of consecutive rows with the same filtered pixel value; and a first row identifier for identifying the first row of said plateau of rows scanned in a scan starting from said row with the most filtered pixels.

8. The device of claim 7 wherein said analyzer determines said positional guideline to be the first row, scanned in a scan starting from said row with the most filtered pixels, that is one of (a) said row with the fewest filtered pixels, and (b) said first row in said plateau of rows.

9. The device of claim 7 wherein the number of filtered pixels in said first row of said plateau of rows is less than or equal to a predetermined percentage of the number of filtered pixels in said row with the most filtered pixels.

10. The device of claim 9 wherein said predetermined percentage is about 50%.

11. The device of claim 9 wherein said predetermined percentage is about 66%.

12. The device of claim 9 wherein said predetermined number of consecutive rows is the difference between the row numbers of (a) said row with the most filtered pixels and (b) the first row, after said row with the most filtered pixels, whose number of filtered pixels is less than or equal to said predetermined percentage of the number of filtered pixels in said row with the most filtered pixels.

13. The device of claim 1 wherein said positional guideline is a baseline of said handwritten block.

14. The device of claim 1 wherein said positional guideline is an ascender line of said handwritten block.

15. The device of claim 1 wherein said display is a receiver for receiving input.

16. The device of claim 1 wherein said data entry device is a pen.

17. A method for positioning handwritten data on a display comprising:

receiving input of handwritten data;

displaying said handwritten data;

entering a handwritten block of said handwritten data;

identifying a positional guideline for said handwritten block; and positioning said handwritten block on said display based on said positional guideline of said handwritten block.

18. The method of claim 17 wherein said identifying a positional guideline comprises:

determining the number of pixels per horizontal row of said handwritten block;

determining the number of filtered pixels per row by filtering said number of pixels per horizontal row; and analyzing said filtered pixels per row to determine said positional guideline for said handwritten block.

19. The method of claim 18 wherein determining the number of pixels per horizontal row comprises:

identifying the strokes of said handwritten data;

identifying the points of said strokes;

identifying the row locations of said points of said strokes;

incrementing the number of pixels per horizontal row for each row between the row locations of said points of said strokes.

20. The method of claim 18 wherein said number of filtered pixels per row can be represented by a curve, said method further comprising:

identifying a row with the most filtered pixels on said curve;

identifying row with the fewest filtered pixels on said curve;

identifying the first row with the fewest filtered pixels scanned in a scan starting from said row with the most filtered pixels;

identifying a plateau of rows, said plateau of rows comprising a predetermined number of consecutive rows with the same filtered pixel value; and identifying the first row of said plateau of rows scanned in a scan starting from said row with the most filtered pixels.

21. The method of claim 20 wherein said positional guideline is determined to be the first row, scanned in a scan starting from said row with the most filtered pixels, that is one of (a) said row with the fewest filtered pixels, and (b) said first row in said plateau of rows.

22. The method of claim 20 wherein the number of filtered pixels in said first row of said plateau of rows is less than or equal to a predetermined percentage of the number of filtered pixels in said row with the most filtered pixels.

23. The method of claim 22 wherein said predetermined percentage is about 50%.

24. The method of claim 22 wherein said predetermined percentage is about 66%.

25. The method of claim 22 wherein said predetermined number of consecutive rows is the difference between the row numbers of (a) said row with the most filtered pixels and (b) the first row, after said row with the most filtered pixels, whose number of filtered pixels is less than or equal to said predetermined percentage of the number of filtered pixels in said row with the most filtered pixels.

26. The method of claim 17 wherein said positional guideline is a baseline of said handwritten block.

27. The method of claim 17 wherein said positional guideline is an ascender line of said handwritten block.

28. The method of claim 17 wherein said display receives and displays said handwritten data.

29. The method of claim 17 wherein a pen is used to enter said handwritten block of said handwritten data.

30. The method of claim 18 wherein a wide moving average is used to determine the number of filtered pixels per row from the number of pixels per horizontal row.

31. The method of claim 30 wherein for each horizontal row, said wide moving average is the average of the number of pixels in said horizontal row, and at most a predetermined number of horizontal rows before and after said horizontal row.

32. The method of claim 31 wherein said predetermined number is 16.

* * * * *